(12) United States Patent
Shao et al.

(10) Patent No.: US 12,422,107 B2
(45) Date of Patent: *Sep. 23, 2025

(54) METHOD, INTERNET OF THINGS SYSTEM, AND MEDIUM FOR PREVENTING ELECTROCHEMICAL CORROSION OF SMART GAS PIPELINE

(71) Applicant: CHENGDU QINCHUAN IOT TECHNOLOGY CO., LTD., Sichuan (CN)

(72) Inventors: Zehua Shao, Chengdu (CN); Yong Li, Chengdu (CN); Junyan Zhou, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 58 days.

This patent is subject to a terminal disclaimer.

(21) Appl. No.: 18/530,168

(22) Filed: Dec. 5, 2023

(65) Prior Publication Data

US 2024/0200732 A1 Jun. 20, 2024

Related U.S. Application Data

(63) Continuation of application No. 18/153,326, filed on Jan. 11, 2023, now Pat. No. 11,879,599.

(30) Foreign Application Priority Data

Dec. 16, 2022 (CN) .......................... 202211619259.5

(51) Int. Cl.
*F17D 5/06* (2006.01)
*G01N 17/02* (2006.01)

(52) U.S. Cl.
CPC ............... *F17D 5/06* (2013.01); *G01N 17/02* (2013.01)

(58) Field of Classification Search
CPC .................................. F17D 5/06; G01N 17/02
See application file for complete search history.

(56) References Cited

U.S. PATENT DOCUMENTS 11,879,599 B2 * 1/2024 Shao ...................... G06Q 10/20
2014/0278148 A1 9/2014 Ziegel et al.
(Continued)

FOREIGN PATENT DOCUMENTS

AU 2021101888 A4 6/2021
CN 101071098 A 11/2007
(Continued)

OTHER PUBLICATIONS

Fan, Zheng et al., Prediction of Tubular Corrosion Rate under Multiphase Dynamics Condition Based on Wavelet Neural Network, Chemical Industry and Engineering Progress, 37(8): 2904-2911, 2018.

(Continued)

*Primary Examiner* — Shelby A Turner
*Assistant Examiner* — Xiuqin Sun
(74) *Attorney, Agent, or Firm* — METIS IP LLC

(57) ABSTRACT

The embodiments of the present disclosure provide a method for preventing electrochemical corrosion of a smart gas pipeline. The method may be implemented based on a smart gas pipeline network safety management platform of an Internet of Things system for preventing electrochemical corrosion of a smart gas pipeline. The method may include: determining an electrochemical corrosion degree of a gas pipeline at a second time based on environmental data of the gas pipeline at a first time, wherein the first time is before the second time; obtaining a difference between a thickness of the gas pipeline and the electrochemical corrosion degree at
(Continued)

the second time; and determining, based on the electrochemical corrosion degree, a protection scheme of the gas pipeline.

10 Claims, 6 Drawing Sheets

(56) References Cited

U.S. PATENT DOCUMENTS

| | | | |
|---|---|---|---|
| 2016/0161448 A1 | 6/2016 | Huang et al. | |
| 2018/0363149 A1* | 12/2018 | Dingman | C23F 13/22 |
| 2018/0365555 A1 | 12/2018 | Aslam | |
| 2020/0176088 A1 | 6/2020 | Kanamarlapudi et al. | |
| 2021/0115780 A1 | 4/2021 | Hyland | |
| 2022/0169381 A1 | 6/2022 | Alrasheed et al. | |
| 2022/0291643 A1 | 9/2022 | Gotou et al. | |
| 2023/0014791 A1* | 1/2023 | Tinnea | G01N 17/02 |

FOREIGN PATENT DOCUMENTS

| | | | | |
|---|---|---|---|---|
| CN | 105915581 | A | 8/2016 | |
| CN | 107145685 | A | 9/2017 | |
| CN | 108562529 | A | 9/2018 | |
| CN | 111783354 | | 10/2020 | |
| CN | 112255189 | A | 1/2021 | |
| CN | 113239504 | A * | 8/2021 | G06F 30/18 |
| CN | 113433057 | A | 9/2021 | |
| CN | 113806902 | A | 12/2021 | |
| CN | 114841080 | A | 8/2022 | |
| CN | 115165725 | A | 10/2022 | |
| CN | 115186590 | A * | 10/2022 | G06F 30/27 |
| CN | 115356978 | A * | 11/2022 | G08B 17/10 |
| CN | 115456315 | A | 12/2022 | |
| IN | 202021003471 | A | 6/2020 | |
| JP | 7088396 | B1 | 6/2022 | |
| WO | 2011068287 | A1 | 6/2011 | |
| WO | 2013040667 | A1 | 3/2013 | |
| WO | 2021133265 | A1 | 7/2021 | |
| WO | 2021171273 | A1 | 9/2021 | |
| WO | 2022046857 | A1 | 3/2022 | |

OTHER PUBLICATIONS

First Office Action in Chinese Application No. 202211619259.5 mailed on Jan. 28, 2023, 21 pages.
Notification to Grant Patent Right for Invention in Chinese Application No. 202211619259.5 mailed on Feb. 16, 2023, 2 pages.
Huang, Ronghui et al., Fuzzy Comprehensive Assessment Method for Gas Pipeline Corrosion Status, Equipment Management and Maintenance, 2017, 5 pages.

* cited by examiner

600

```
┌─────────────────────────────────────────────────────────┐
│ Determining a plurality of candidate site selection schemes, │
│ each of the plurality of candidate site selection schemes   │──610
│ comprising a set of site selection coordinates of the cathode│
│                  protection station                         │
└─────────────────────────────────────────────────────────┘
                            │
                            ▼
┌─────────────────────────────────────────────────────────┐
│ Determining a target site selection scheme based on a preset │
│ evaluation function by performing at least one round of     │──620
│ iterative updating on the plurality of candidate site selection│
│                         schemes                             │
└─────────────────────────────────────────────────────────┘
```

FIG. 6

METHOD, INTERNET OF THINGS SYSTEM, AND MEDIUM FOR PREVENTING ELECTROCHEMICAL CORROSION OF SMART GAS PIPELINE

CROSS-REFERENCE TO RELATED APPLICATION

This application is a continuation of U.S. application Ser. No. 18/153,326, filed on Jan. 11, 2023, which claims priority of Chinese Application No. 202211619259.5, filed on Dec. 16, 2022, the entire contents of each of which are hereby incorporated by reference.

TECHNICAL FIELD

The present disclosure relates to the field of gas pipeline network safety, and in particular, to a method, an Internet of Things system, and a medium for preventing electrochemical corrosion of a smart gas pipeline.

BACKGROUND

A gas pipeline is an important facility for gas supply in a gas pipeline network. With operation of the gas pipeline network, safety problems such as damage, corrosion, etc. will inevitably occur in the gas pipeline. The safety assessment and protection of the gas pipeline are also extremely important. However, the gas pipeline network is usually relatively large, and the safety problems that occur are difficult to be detected, which brings a lot of pressure to inspection and protection of the gas pipeline, and the time, manpower and material costs required are incalculable. In particular, a surrounding environment of a gas pipeline buried underground is relatively complex. External factors such as a position, a burial depth, soil composition, a water content, acid-base property, oxygen concentration, etc. of different pipelines also vary greatly. At the same time, the external factors also vary to different extents over time, which poses a major challenge to the safety management of the gas pipeline network. How to effectively evaluate and protect the safety of the gas pipeline is a valuable topic that has a far-reaching impact on society.

Therefore, it is desirable to provide a method, an Internet of Things system, and a medium for preventing electrochemical corrosion of a smart gas pipeline, which can help to quickly and efficiently determine electrochemical corrosion of the gas pipeline in the gas pipeline network, and make a targeted protection scheme of the gas pipeline.

SUMMARY

One of the embodiments of the present disclosure provides a method for preventing electrochemical corrosion of a smart gas pipeline. The method may be implemented based on a smart gas pipeline network safety management platform of an Internet of Things (IoT) system for preventing electrochemical corrosion of a smart gas pipeline. The method may include: determining an electrochemical corrosion degree of a gas pipeline at a second time based on environmental data of the gas pipeline at a first time, wherein the first time is before the second time; obtaining a difference between a thickness of the gas pipeline and the electrochemical corrosion degree at the second time; and determining, based on the electrochemical corrosion degree, a protection scheme of the gas pipeline, wherein the determining, based on the electrochemical corrosion degree, a protection scheme of the gas pipeline includes: determining a plurality of candidate site selection schemes of at least one cathode protection station, each of the plurality of candidate site selection schemes comprising a set of site selection coordinates of the at least one cathode protection station; and performing at least one round of iterative updating on the plurality of candidate site selection schemes based on a preset algorithm and evaluating the plurality of candidate site selection schemes after the at least one round of iterative updating using a preset evaluation function to determine a target site selection scheme; and determining a cathode protection scheme based on the target site selection scheme, and determining a protection scheme of the gas pipeline based on the cathode protection scheme and an anode sacrifice protection scheme.

One of the embodiments of the present disclosure provides an Internet of Things (IoT) system for preventing electrochemical corrosion of a smart gas pipeline. The IoT system may include a smart gas user platform, a smart gas service platform, a smart gas pipeline network safety management platform, a smart gas pipeline network sensor network platform, and a smart gas pipeline network object platform. The smart gas pipeline network object platform may be configured to obtain environmental data of a gas pipeline at a first time, and transmit the environmental data to the smart gas pipeline network safety management platform through the smart gas pipeline network sensor network platform. The smart gas pipeline network safety management platform is configured to: determine an electrochemical corrosion degree of a gas pipeline at a second time based on the environmental data of the gas pipeline at the first time, wherein the first time is before the second time; obtain a difference between a thickness of the gas pipeline and the electrochemical corrosion degree at the second time; and determine, based on the electrochemical corrosion degree, a protection scheme of the gas pipeline, wherein to determine the protection scheme of the gas pipeline, the smart gas pipeline network safety management platform is further configured to: determine a plurality of candidate site selection schemes of at least one cathode protection station, each of the plurality of candidate site selection schemes comprising a set of site selection coordinates of the at least one cathode protection station; and perform at least one round of iterative updating on the plurality of candidate site selection schemes based on a preset algorithm and evaluate the plurality of candidate site selection schemes after the at least one round of iterative updating using a preset evaluation function to determine a target site selection scheme; and determine a cathode protection scheme based on the target site selection scheme, and determine a protection scheme of the gas pipeline based on the cathode protection scheme and an anode sacrifice protection scheme.

One of the embodiments of the present disclosure provides a non-transitory computer-readable storage medium storing computer instructions. When reading the computer instructions in the storage medium, a computer may implement the method for preventing electrochemical corrosion of a smart gas pipeline.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein:

FIG. 6 is a flowchart illustrating an exemplary process for determining a target site selection scheme according to some embodiments of the present disclosure.

DETAILED DESCRIPTION

Figure 1:
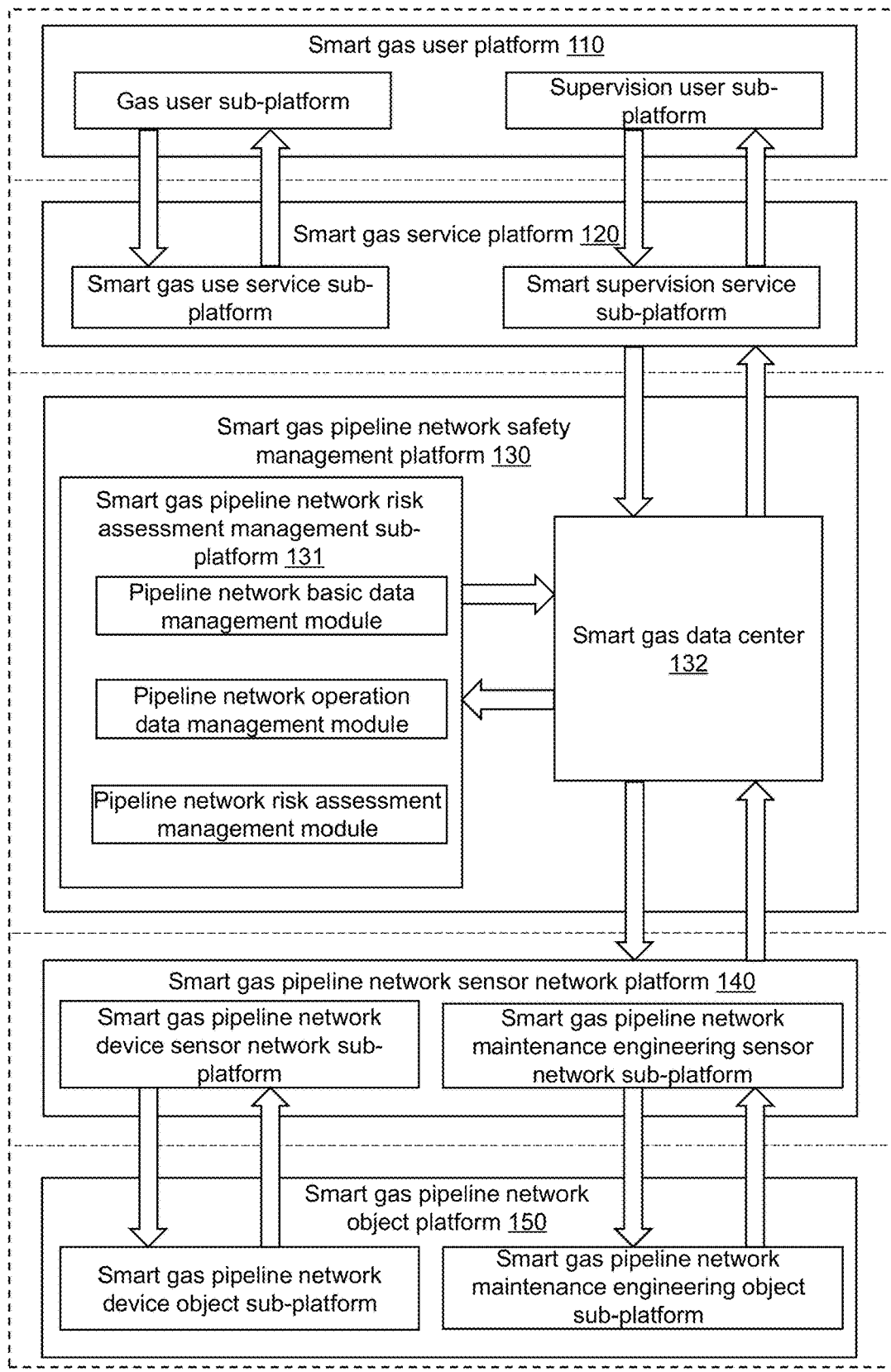
FIG. 1 is a schematic diagram illustrating an exemplary structure of an Internet of Things system for assessing electrochemical corrosion of a smart gas pipeline according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram of illustrating an exemplary structure of an Internet of Things (IoT) system 100 for assessing electrochemical corrosion of a smart gas pipelines according to some embodiments of the present disclosure. The IoT system 100 for assessing electrochemical corrosion of a gas pipelines involved in the embodiments of the present disclosure is described in detail below. It should be noted that the embodiments are merely for the purpose of illustration of the present disclosure, and not intended to limit the present disclosure.

The IoT system may be an information processing system that includes part or all of a user platform, a service platform, a management platform, a sensor network platform, and an object platform. The user platform may be a functional platform for obtaining user's perceptual information and generating control information. The service platform may realize connection between the management platform and the user platform, and play functions of perceptual information service communication and control information service communication. The management platform may overall plan and coordinate connection and cooperation among various functional platforms (e.g., the user platform and the service platform). The management platform may gather information of an IoT operation system and may provide functions of perception management and control management for the IoT operation system. The sensor network platform may be a functional platform for managing sensor communication. In some embodiments, the sensor network platform may connect the management platform and the object platform, and realize functions of perceptual communication sensor communication and control information sensor communication. The object platform may be a functional platform for generating perceptual information.

In some embodiments, when applied to gas management, the IoT system may be called an Internet of Things system of smart gas.

In some embodiments, as shown in FIG. 1, the Internet of Things system 100 for assessing electrochemical corrosion of a smart gas pipeline may include a smart gas user platform 110, a smart gas service platform 120, a smart gas pipeline network safety management platform 130, a smart gas pipeline network sensor network platform 140, and a smart gas pipeline network object platform 150.

The smart gas user platform 110 may be a platform for interacting with a user. The user may be a gas user, a supervision user, etc. In some embodiments, the smart gas user platform 110 may be configured as a terminal device. For example, the terminal device may include a mobile device, a tablet computer, or the like, or any combination thereof. In some embodiments, the smart gas user platform 110 may be used to receive information or an instruction. For example, the smart gas user platform 110 may obtain a protection scheme of the gas pipeline generated by the smart gas pipeline network safety management platform 130 through the terminal device. In some embodiments, the smart gas user platform 110 may send a request or an instruction input by the user to the smart gas service platform 120, and obtain corresponding information fed back by the smart gas service platform 120.

In some embodiments, the smart gas user platform 110 may include a gas user sub-platform and a supervision user sub-platform. The gas user sub-platform may correspond to a smart gas use service sub-platform. For example, the gas user sub-platform may send reminder information, alarm information, etc. of gas use to the gas user through the terminal device. The supervision user sub-platform may correspond to a smart supervision service sub-platform. In some embodiments, the supervision user may supervise and manage safe operation of the entire IoT system through the supervision user sub-platform, so as to ensure safe and orderly operation of the IoT system 100 for assessing electrochemical corrosion of a smart gas pipeline.

The smart gas service platform 120 may be a platform used to convey needs and control information of the user. The smart gas service platform 120 may be connected to the smart gas user platform 110 and the smart gas pipeline network safety management platform 130. The smart gas service platform 120 may obtain gas pipeline network safety management data from the smart gas pipeline network safety management platform 130 (e.g., a smart gas data center 132), and send the data to the smart gas user platform 110. In some embodiments, the smart gas service platform 120 may include a processing device and other components. The processing device may be a server or a server group.

In some embodiments, the smart gas service platform 120 may include the smart gas use service sub-platform and the smart supervision service sub-platform. The smart gas use service sub-platform may be a platform that provides the gas user with a gas service, which may correspond to the gas user sub-platform. For example, the smart gas use service sub-platform may send information such as a gas bill, a gas safety guideline, and a gas use abnormality reminder to the gas user sub-platform. The smart supervision service sub-platform may be a platform that provides a supervision need for the supervision user, which may correspond to the supervision user sub-platform. For example, the smart supervision service sub-platform may send the safety management information of a gas device, scheduling and maintenance information of a gas pipeline network maintenance engineering, etc. to the supervision user sub-platform.

The smart gas pipeline network safety management platform 130 may refer to a platform for overall planning and coordinating connection and collaboration among various functional platforms, gathering all the information of the IoT, and providing the functions of perception management and control management for the IoT operation system. In some embodiments, the smart gas pipeline network safety management platform 130 may include a processing device and other components. The processing device may be a server or a server group. In some embodiments, the smart gas pipeline network safety management platform 130 may be a remote platform controlled by a user, artificial intelligence, or a preset rule.

In some embodiments, the smart gas pipeline network safety management platform 130 may include a smart gas pipeline network risk assessment management sub-platform 131 and a smart gas data center 132.

The smart gas pipeline network risk assessment management sub-platform 131 may be a platform for analyzing and processing the pipeline network safety management data. In some embodiments, the smart gas pipeline network risk assessment management sub-platform may perform a bidirectional interaction with the smart gas data center. For example, the smart gas pipeline network risk assessment management sub-platform may obtain data related to pipeline network safety management (e.g., gas pipeline corrosion information, information of the pipeline network maintenance engineering) from the smart gas data center for analysis and processing, and send a processing result to the smart gas data center 132.

In some embodiments, the smart gas pipeline network risk assessment management sub-platform 131 may include a pipeline network basic data management module, a pipeline network operation data management module, and a pipeline network risk assessment management module. The pipeline network basic data management module may be used to process information including a gas pipeline network environment, a pipeline material, a service life, an anti-corrosion condition, etc. The pipeline network operation data management module may be used to process information including pipeline network pressure, leakage data, maintenance status, etc. The pipeline network risk assessment management module may be used to perform operations including: combining basic data and operation data of the pipeline network to form a pipeline network safety risk assessment based on a preset model, performing a safety risk classification according to an assessment result, and combining a geographic information system (GIS) to perform three-dimensional visualization management with different colors. It should be noted that the above management modules are not intended to limit the management modules included in the smart gas pipeline network risk assessment management sub-platform 131. The smart gas pipeline network risk assessment management sub-platform 131 may also include other modules according to actual needs. For example, the pipeline network geographic information management module may view geographic information, etc. of the pipeline and the device in real time to provide data support for on-site operation.

The smart gas data center 132 may be used to store and manage all operation information of the IoT system 100 for assessing electrochemical corrosion of a smart gas pipeline. In some embodiments, the smart gas data center 132 may be configured as a storage device (e.g., a database) for storing historical and current gas pipeline network safety management data. For example, the smart gas data center 132 may store environmental data of the gas pipeline (e.g., soil composition, a burial depth, a soil pH value, humidity, etc.), pipeline material, pipeline corrosion information, safety risk assessment information, etc.

In some embodiments, the smart gas pipeline network safety management platform 130 may perform information interaction with the smart gas service platform 120 and the smart gas pipeline network sensor network platform 140 through the smart gas data center 132, respectively. For example, the smart gas data center 132 may send the protection scheme of the gas pipeline network to the smart gas service platform 120. As another example, the smart gas data center may send an instruction for obtaining operation information of the gas pipeline network to the smart gas pipeline network sensor network platform 140 (e.g., a smart gas pipeline network device sensor network sub-platform), and receive operation information of the gas pipeline network device uploaded by the smart gas pipeline network sensor network platform.

The smart gas pipeline network sensor network platform 140 may be a functional platform for managing sensor communication. In some embodiments, the smart gas pipeline network sensor network platform 140 may be connected to the smart gas pipeline network safety management platform 130 and the smart gas pipeline network object platform 150 to realize the functions of perceptual information sensor communication and control information sensor communication.

In some embodiments, the smart gas pipeline network sensor network platform 140 may include the smart gas pipeline network device sensor network sub-platform and a smart gas pipeline network maintenance engineering sensor network sub-platform. The smart gas pipeline network device sensor network sub-platform may send the operation information of the gas pipeline network device (e.g., gas pipeline corrosion information) uploaded by a smart gas pipeline network device object sub-platform to the smart gas data center 132. The smart gas pipeline network maintenance engineering sensor network sub-platform may send information related to the maintenance engineering (e.g., maintenance progress) uploaded by a smart gas pipeline network maintenance engineering object sub-platform to the smart gas data center 132.

The smart gas pipeline network object platform 150 may be a functional platform for generating perceptual information. For example, the smart gas pipeline network object platform 150 may generate safe operation information of the gas pipeline network (for example, abnormal information of the gas pipeline, maintenance information of the maintenance engineering, etc.), and upload the information to the smart gas data center 132 through the smart gas pipeline network sensor network platform 140.

In some embodiments, the smart gas pipeline network object platform 150 may include the smart gas pipeline network device object sub-platform and the smart gas pipeline network maintenance engineering object sub-platform. In some embodiments, the smart gas pipeline network device object sub-platform may be configured as various types of gas devices and monitoring devices, which may be used to obtain the operation information of the gas pipeline network device and monitoring information of the pipeline network. For example, the smart gas pipeline network device object sub-platform may obtain an indicator such as gas flow, pressure, temperature, etc. of the gas pipeline network device in real time through a gas flow meter, a pressure sensor, a temperature sensor, an infrared equipment, etc., and send the indicator to the smart gas data center 132 through the smart gas pipeline network equipment sensor network sub-platform. In some embodiments, the smart gas pipeline network maintenance engineering object sub-platform may include various types of maintenance devices, etc. For example, the smart gas pipeline network maintenance engineering object sub-platform may include a maintenance vehicle, a maintenance appliance, an alarm device, etc. The smart gas pipeline network maintenance engineering object sub-platform may upload implementation of the pipeline network maintenance engineering (e.g., maintenance progress) to the smart gas data center 132 through the smart gas pipeline network maintenance engineering sensor network sub-platform.

In some embodiments of the present disclosure, based on the IoT system 100 for assessing electrochemical corrosion of a smart gas pipeline, a closed loop of perceptual and control information operation service among the gas pipeline network device, gas pipeline network maintenance personnel, a gas operator, and the user may be formed, which can ensure effectiveness of the safety management of the gas pipeline network.

It should be noted that the above IoT system 100 for assessing electrochemical corrosion of a smart gas pipeline is provided merely for the purpose of illustration, and is not intended to limit the scope of the present disclosure. For those skilled in the art, various modifications or changes can be made based on the description of the present disclosure. For example, the IoT system for assessing electrochemical corrosion of a smart gas pipeline may include one or more other suitable components to achieve similar or different functions. However, changes and modifications do not depart from the scope of the present disclosure.

Figure 2:
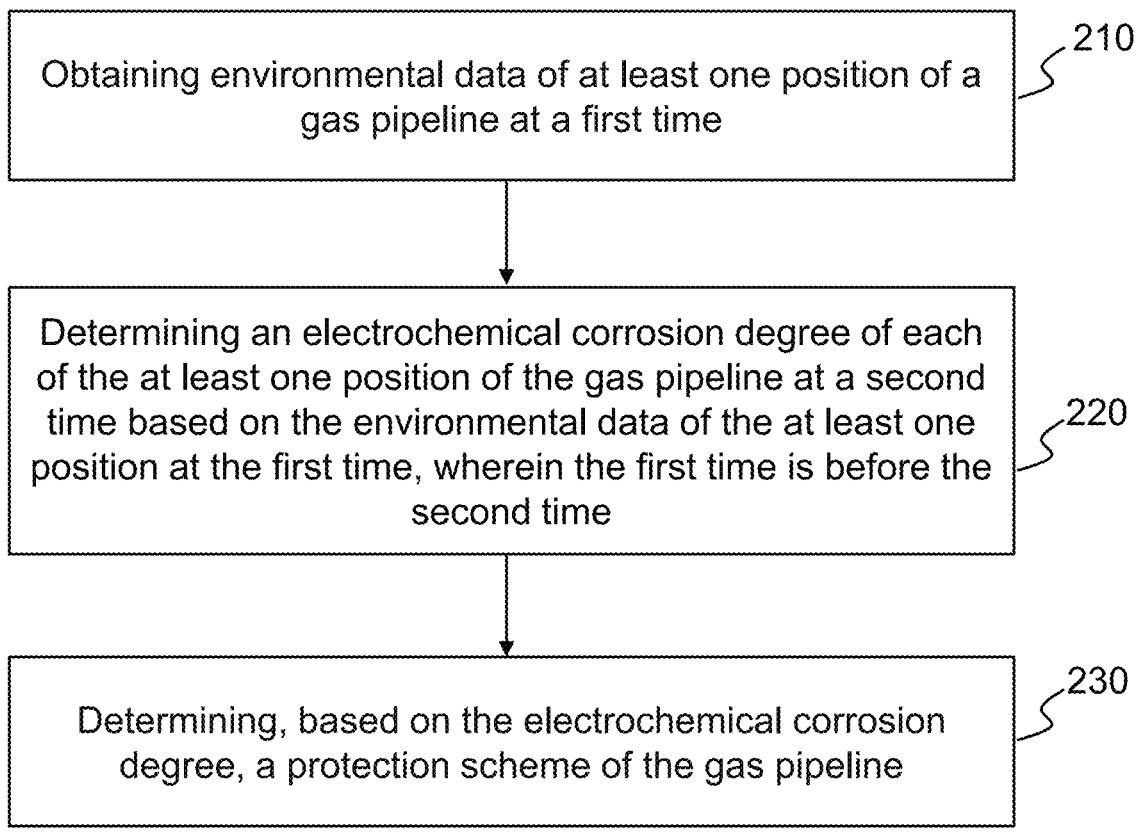
FIG. 2 is a flowchart illustrating an exemplary process of a method for assessing electrochemical corrosion of a smart gas pipeline according to some embodiments of the present disclosure.

FIG. 2 is a flowchart illustrating an exemplary process of a method for assessing electrochemical corrosion of a smart gas pipeline according to some embodiments of the present disclosure.

In some embodiments, the process 200 may be performed by the smart gas pipeline network safety management platform 130. As shown in FIG. 2, the process 200 may include the following operations.

In 210, obtaining environmental data of at least one position of a gas pipeline at a first time.

The gas pipeline may refer to at least one section of a pipeline in a gas pipeline network for transporting gas. For example, the gas pipeline may be an underground pipeline arranged in area A or area B of a city.

The gas pipeline may include property information of the pipeline such as material, a thickness, a diameter, a service life, etc. of the gas pipeline. The gas pipeline may also include other information such as underground depth where the pipeline is buried, composition of the surrounding soil, temperature, humidity, pressure, etc. In some embodiments, the smart gas pipeline network safety management platform 130 may obtain information related to the gas pipeline from the smart gas data center 132.

The first time may be a historical time. For example, the first time may be a past month, a past week, or the like.

The at least one position may be one or more positions of the gas pipeline. For example, the at least one position may be position 1, position 2, position 3, etc. of an outer wall of a certain section of the pipeline. In some embodiments, the at least one position may be a position sequence based on a preset distance step. For example, 1 m may be preset as the distance step, and a position point may be obtained every 1 m. Each position point may number and mark the at least one position of the gas pipeline based on a distribution area, length, etc. of the gas pipeline. For example, for a section of the gas pipeline in area A, the position sequence form of the at least one position may be (A1, A2, A3, A4, . . . , An), etc.

The environmental data may refer to environmental data around the gas pipeline. For example, the environmental data may include, but is not limited to, composition, a water content, acid-base property, a burial depth, oxygen concentration, etc. of soil around the gas pipeline. The environmental data may also include other data such as rainfall, an air pollution level, or the like, or any combination thereof. The environmental data of gas pipelines in different areas may be different according to different burial positions and burial depths. Accordingly, the environmental data corresponding to different positions of the gas pipeline may be different.

In some embodiments, the environmental data may be obtained based on a monitoring device (e.g., various sensors) of the smart gas pipeline network object platform 150 (e.g., a smart gas pipeline network device object sub-platform), and uploaded to the smart gas data center 132 through the smart gas pipeline network sensor network platform 140. The smart gas pipeline network safety management platform 130 may obtain the environmental data corresponding to the at least one position of the gas pipeline from the smart gas data center 132. For the relevant description of the smart gas pipeline network object platform 150 and the smart gas pipeline network sensor network platform 140, please refer to FIG. 1 and description thereof.

In 220, determining an electrochemical corrosion degree of each of the at least one position of the gas pipeline at a second time based on the environmental data of the at least one position at the first time. The first time may be before the second time.

The second time may refer to one or more moments in the future. For example, 00:00 on a future day, 00:00 on the $1^{st}$ of a next month, 00:00 on the $2^{nd}$ of the next month, etc. In some embodiments, the second time may be a time sequence after the first time based on a preset time step. For example, 1 day may be preset as the time step, and a time point may be obtained every 1 day. Exemplarily, the second time may be a time sequence of the $1^{st}$, $2^{nd}$, $3^{rd}$, . . . , $20^{th}$ of the next month, etc.. The time point in the time sequence may be in the form of a date, a timestamp, etc. The preset time step of the second time may be the same as a preset time step of the first time, for example, both the preset time steps may be 1 day, 1 week, etc.

The electrochemical corrosion degree may refer to a degree to which the gas pipeline is corroded by an electrochemical reaction. The electrochemical corrosion degree may be characterized by an electrochemical corrosion thickness. For example, the electrochemical corrosion thicknesses of different positions of the gas pipeline may be 0.5 mm, 1 mm, etc.

In some embodiments, the smart gas pipeline network object platform 150 (e.g., the monitoring device of the smart gas pipeline network device object sub-platform) may obtain monitoring information of the gas pipeline (e.g., data of the gas pipeline itself, the environmental data of each position, etc.). The smart gas pipeline network safety management platform 130 may process the monitoring information based on modeling or various analysis algorithms, and determine the electrochemical corrosion degree of each position of the gas pipeline. For example, the electrochemical corrosion degree at the second time may be determined by experience or prior knowledge. For example, a time curve of electrochemical corrosion of the gas pipeline may be constructed according to the prior knowledge, and the electrochemical corrosion degree at the second time may be determined based on the time curve. For example, the time curve may include relationships of electrochemical corrosion degrees of gas pipelines over time under different conditions such as gas pipeline properties (e.g., material and composition of gas pipeline), burial environment of gas pipeline (e.g., composition, humidity and temperature of soil), etc.

In some embodiments, the smart gas pipeline network safety management platform 130 may determine the electrochemical corrosion degree of each of the at least one position of the gas pipeline by processing the environmental data of the gas pipeline and information related to the gas pipeline based on a corrosion thickness prediction model. Please refer to FIGS. 3 and 4 and description thereof for the relevant description of the corrosion thickness prediction model.

In 230, determining, based on the degree of electrochemical corrosion, a protection scheme of the gas pipeline.

The protection scheme may refer to a scheme for prevention or maintenance of the gas pipeline. For example, for a gas pipeline with relatively serious electrochemical corrosion, the corresponding gas pipeline may be periodically maintained and repaired based on the smart gas pipeline network maintenance engineering object sub-platform.

In some embodiments, the protection scheme may also be a scheme for the prevention of the gas pipeline according to the electrochemical corrosion of the gas pipeline. For example, the smart gas pipeline network safety management platform 130 may make targeted preventive measures according to influence of the environmental data, a trend of electrochemical corrosion on the gas pipeline at different positions. For example, an anti-corrosion coating may be applied to the outer wall of the gas pipeline in advance. Please refer to FIG. 5 and description thereof for the relevant description of the protection scheme of the gas pipeline.

In some embodiments of the present disclosure, by determining the electrochemical corrosion degree of the gas pipeline according to the positions and different environmental data of different gas pipelines, and then determining the corresponding protection scheme, a reasonable safety assessment of the gas pipeline can be realized, which is helpful to obtain a targeted protection scheme.

It should be noted that the above description about the process 200 is provided merely for example and illustration, and not intended to limit the scope of the present disclosure. For those skilled in the art, various modifications and changes can be made to the process under the guidance of the present disclosure. However, these corrections and changes are still within the scope of the present disclosure.

Figure 3:
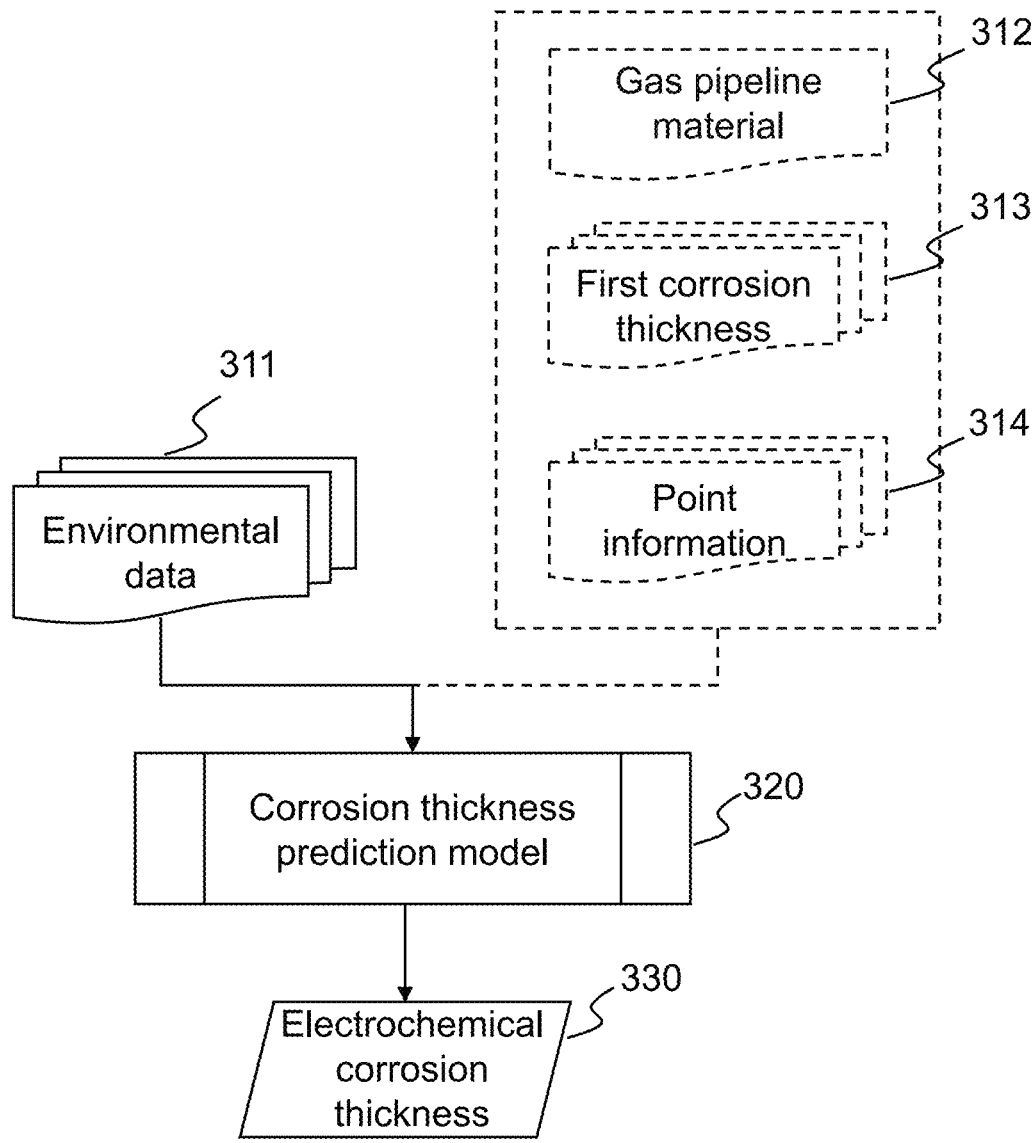
FIG. 3 is a schematic diagram illustrating an exemplary process for determining an electrochemical corrosion thickness of a gas pipeline according to some embodiments of the present disclosure.

FIG. 3 is a schematic diagram illustrating an exemplary process for determining an electrochemical corrosion thickness of a gas pipeline according to some embodiments of the present disclosure.

In some embodiments, the smart gas pipeline network safety management platform 130 may determine the electrochemical corrosion thickness of each of at least one position of the gas pipeline at the second time by processing environmental data based on a corrosion thickness prediction model. The corrosion thickness prediction model may be a machine learning model.

The corrosion thickness prediction model may refer to a model for predicting the electrochemical corrosion thickness of each position of the gas pipeline. In some embodiments, the corrosion thickness prediction model may be a trained machine learning model. For example, the corrosion thickness prediction model may include a recurrent neural networks (RNN) model, a long short-term memory (LSTM) neural networks model, a deep neural networks (DNN) model, other custom model structures, or any combination thereof.

In some embodiments, an input of the corrosion thickness prediction model may include the environmental data of the gas pipeline. The environmental data may be processed by the corrosion thickness prediction model. An output of the corrosion thickness prediction model may include the electrochemical corrosion thickness of the gas pipeline at the second time.

The environmental data input to the corrosion thickness prediction model may refer to environmental data of each of at least one position of the gas pipeline a first time. The environmental data may be an environmental data sequence corresponding to the at least one position sequence. See FIG. 1 and description thereof for the environmental data.

In some embodiments, the environmental data may be represented by a vector or a vector matrix. For example, an environmental vector of a certain position of the gas pipeline may be represented by a vector (a, b, c, d), where the first element a in the vector denotes soil moisture, the second element b denotes acid-base property (PH value) of the soil, the third element c denotes oxygen concentration of the soil, and the fourth element d denotes humidity of the soil. Further, the environmental data corresponding to the position sequence formed by the at least one position may be represented by a multi-row and multi-column vector matrix as follows:

$$\begin{bmatrix} a1 & b1 & c1 & d1 \\ a2 & b2 & c2 & d2 \\ a3 & b3 & c3 & d3 \end{bmatrix}.$$

where a count of rows of the vector matrix is equal to a count of positions of the at least one position, and a count of columns is equal to a count of elements of the environment vector. The first row of (a1, b1, c1, d1) of the vector matrix denotes the environmental data of a first position of the at least one position of the gas pipeline. The second row of (a2, b2, c2, d2) denotes the environmental data of a second position of the at least one position of the gas pipeline, and so on. It should be noted that the representation of the vector or the vector matrix herein is for example only, which is not intended to limit herein. For example, the environment vector may also include other environment data such as temperature, pressure, etc.

The electrochemical corrosion thickness output by the corrosion thickness prediction model may refer to electrochemical corrosion thickness of each of the at least one position of the gas pipeline at the second time. The electrochemical corrosion thickness may be an electrochemical corrosion thickness sequence corresponding to the at least one position sequence, i.e., each position may correspond to an electrochemical corrosion thickness. It should be noted that the at least one position of the gas pipeline at the second time may correspond to the at least one position at the first time. Please refer to FIG. 1 and description thereof for the electrochemical corrosion thickness.

In some embodiments, the electrochemical corrosion thickness may be represented in vector form. Merely by way of example, electrochemical corrosion thicknesses of three positions of a certain segment of the gas pipeline may be represented by a vector (v1, v2, v3), where the three elements in the vector respectively denote the electrochemical corrosion thickness of a first position, the electrochemical corrosion thickness of a second position, and the electrochemical corrosion thickness of a third position.

It can be understood that, according to the environmental data of each position of the gas pipeline, analyzing an historical electrochemical corrosion degree of the gas pipeline may predict information such as a trend, a probability, etc. of the electrochemical corrosion degree of the gas pipeline in the future.

As shown in FIG. 3, the smart gas pipeline network safety management platform 130 may input the environmental data 311 into the corrosion thickness prediction model 320, process the environmental data 311 through the corrosion thickness prediction model 320, and output the electrochemical corrosion thickness 330.

In some embodiments, the corrosion thickness prediction model may be obtained by training a plurality of sets of first training samples with first labels. The first training sample may include sample environmental data of a plurality of positions of the gas pipeline at the first time. The sample environmental data may be historical environmental data of a past month, a past week, etc. For example, environmental data of each position of the gas pipeline on the $1^{st}$, $2^{nd}$, $3^{rd}$, . . . , $20^{th}$ of a previous month may be used as a set of sample environmental data. Accordingly, corresponding $21^{st}$, $22^{nd}$, etc. of the previous month may be used as the second time relative to the first time. The first label may be the electrochemical corrosion thickness of the corresponding plurality of positions of the gas pipeline obtained by the monitoring device at the second time. The label may be labelled manually, etc.

When training an initial corrosion thickness prediction model, the smart gas pipeline network safety management platform 130 may input each group of sample historical environmental data into the initial corrosion thickness prediction model, process each group of sample historical environmental data through the corrosion thickness prediction model, and output the electrochemical corrosion thickness. The smart gas pipeline network safety management platform 130 may construct a loss function based on the label of each set of sample historical environmental data and the output of the corrosion thickness prediction model, iteratively update parameters of the initial corrosion thickness prediction model based on the loss function until a preset condition is satisfied, complete the training, and obtain a trained corrosion thickness prediction model. The preset condition may be that the loss function is smaller than a threshold, the loss function converges, or a training period reaches a threshold.

In some embodiments, the input of the corrosion thickness prediction model may further include: gas pipeline material, a corrosion thickness of each of the at least one position at the first time, and point information of each of the at least one position.

The gas pipeline material may represent material information of the gas pipeline. For example, the gas pipeline material may include information such as a metal type (such as iron) of the gas pipeline, a type and a content of impurities in the metal, etc.

The corrosion thickness may be referred to as the electrochemical corrosion thickness, and the corrosion thickness of each of the at least one position at the first time may be obtained based on historical data. Exemplarily, the first time may be $1^{st}$, $2^{nd}$, and $3^{rd}$ of a last month, and the smart gas pipeline network safety management platform 130 may obtain the corrosion thickness of each of at least one position of the gas pipeline on the $1^{st}$, $2^{nd}$, and $3^{rd}$ of the last month from the smart gas data center.

The point information may refer to position information of each position on a surface of the gas pipeline. The point position information of each of the at least one position may include a geographic position, an underground burial depth, etc. of each position. It can be understood that the point information of different positions may also characterize a distance information between two positions. For example, the smart gas pipeline network safety management platform 130 may obtain, based on two adjacent point information, the relative distance between two positions corresponding to the two point information.

Each point information may be expressed in various forms such as vector representation, coordinate representation, etc. Accordingly, the plurality of point information may be in the form of a point sequence or a point matrix.

In some embodiments, the smart gas pipeline network safety management platform 130 may input the environmental data 311 of the gas pipeline, the gas pipeline material 312, a first corrosion thickness 313, and the point information 314 into the corrosion thickness prediction model 320, process the environmental data 311 of the gas pipeline, the gas pipeline material 312, a first corrosion thickness 313, and the point information 314 through the corrosion thickness prediction model 320, and output the electrochemical corrosion degree 330. For the purpose of convenience, the first corrosion thickness herein may refer to the corrosion thickness of each of the at least one position of the gas pipeline at the first time.

In some embodiments, the first training sample used for training the corrosion thickness prediction model may further include sample gas pipeline material, a sample first corrosion thickness, and sample point information. For training of the corrosion thickness prediction model, please refer to the description regarding the training of the corrosion thickness prediction model above, which is not repeated herein.

In some embodiments of the present disclosure, the electrochemical corrosion of the plurality of positions of the gas pipeline at one or more moments in the future may be effectively predicted through the corrosion thickness prediction model, which can provide a basis for early anticorrosion of the gas pipeline. At the same time, the gas pipeline material, the historical corrosion, the point information may be considered, which can also help to make the predicted result more accurate.

Figure 4:
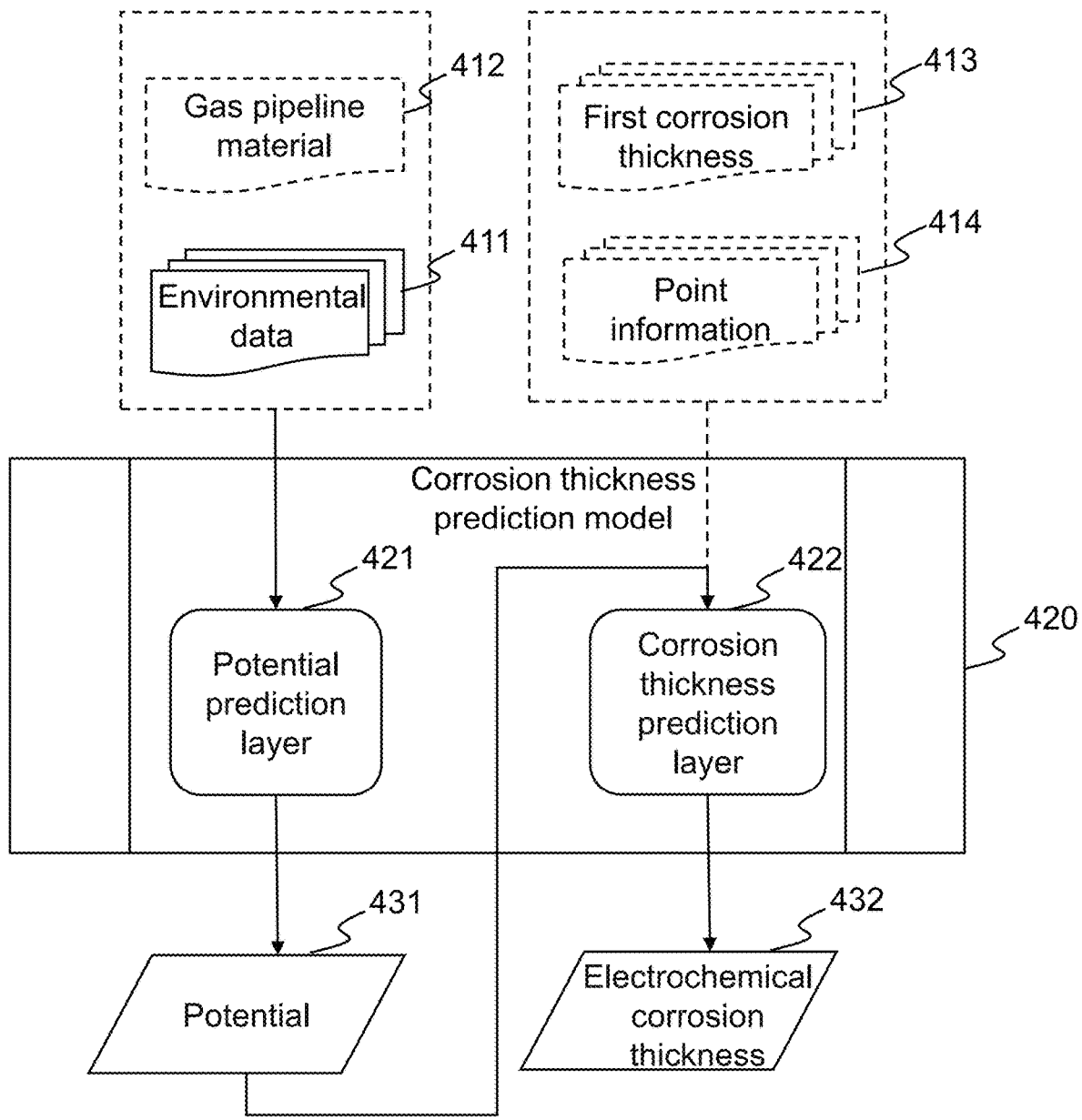
FIG. 4 is a schematic diagram illustrating another exemplary process for determining an electrochemical corrosion thickness of a gas pipeline according to some embodiments of the present disclosure.

FIG. 4 is a schematic diagram illustrating another exemplary process for determining an electrochemical corrosion thickness of a gas pipeline according to some embodiments of the present disclosure.

In some embodiments, a corrosion thickness prediction model may include a potential prediction layer and a corrosion thickness prediction layer. The smart gas pipeline network safety management platform 130 may predict potential of each of the at least one position of the gas pipeline at the second time by processing the environmental data of the at least one position based on the potential prediction layer, and predict the corrosion thickness of each of the at least one position at the second time by processing the potential of each of the at least one position based on the corrosion thickness prediction layer.

The potential prediction layer may refer to a processing layer that determines the potential of each of the at least one position of the gas pipeline. The potential prediction layer may include a DNN model, a RNN model, an LSTM neural networks model, other custom model structures, or any combination thereof.

In some embodiments, the smart gas pipeline network safety management platform 130 may input the environmental data of each position of the at least one position of the gas pipeline at the first time into the potential prediction layer, process the environmental data through the potential prediction layer, and output the potential of each of the at least one position of the gas pipeline at the second time.

In some embodiments, the smart gas pipeline network safety management platform 130 may obtain potential information of each position on a surface of the gas pipeline through the smart gas pipeline network object platform 150 (e.g., a potential sensor). For example, current potential information of the position may be obtained based on the potential sensor arranged at a certain position of the gas pipeline.

In some embodiments, the potential prediction layer may be obtained by individually training a plurality of sets of first training samples with potential labels. The potential label may be potential of a position of the gas pipeline corresponding to each set of first training samples at a historical second time (i.e., a second time after the first time corresponding to the first training sample), which may be obtained by the potential sensor arranged at each position at the second time.

When training an initial potential prediction layer, the smart gas pipeline network safety management platform 130 may input each set of first training samples to the potential prediction layer, process each group of first training samples through the potential prediction layer, and output the potential of each of the at least one position of the gas pipeline at the second time. For a training method of the potential prediction layer, please refer to the above description about the training of the corrosion thickness prediction model.

The corrosion thickness prediction layer may refer to a processing layer that determines the electrochemical corrosion thickness of each of the at least one position of the gas pipeline. The corrosion thickness prediction layer may include an RNN, an LSTM neural networks model, other user-defined model structures, or any combination thereof.

In some embodiments, the corrosion thickness prediction layer may be a Transformer model, which may learn relationship between input data (e.g., the point information and potential information of different positions) based on the training of a plurality of sets of sample data. It can be understood that potential of different positions of the gas pipeline may influence each other (for example, due to a relative high-low relationship of the potential at two positions of the pipeline, formation of the cathode and anode may cause influence such as electron transfer, etc.). In addition, the gas pipeline at each position may be influenced differently by the potential of other positions (e.g., the influence of a potential difference, a distance length, etc. between different pipeline positions). Therefore, the Transformer model with self-attention mechanism may learn correlation between relevant data (e.g., environmental data difference, potential difference, distance difference, etc.) between different positions of the gas pipeline, making the predicted electrochemical corrosion degree of each position more accurate.

In some embodiments, as shown in FIG. 4, the smart gas pipeline network safety management platform 130 may input the potential 431 of a plurality of positions on the surface of the gas pipeline to the corrosion thickness prediction layer 422, and output the electrochemical corrosion thickness 432 of each of the at least one position of the gas pipeline.

In some embodiments, the corrosion thickness prediction layer may be obtained by individually training a plurality of sets of second sample training data with second labels. The second sample training data may include the potential of the plurality of positions of the gas pipeline at the first time. The second label may be an electrochemical corrosion thickness of each position at a historical second time (i.e., a second time after the first time).

When training an initial corrosion thickness prediction layer, the smart gas network safety management platform 130 may input each group of second training samples to the initial corrosion thickness prediction layer, process each group of second training samples through the corrosion thickness prediction layer, and output the electrochemical corrosion thickness of the gas pipeline at the second time. For a training method of the corrosion thickness prediction layer, please refer to the above description about the training of the corrosion thickness prediction model.

In some embodiments, the potential prediction layer and the corrosion thickness prediction layer may be obtained through joint training of the first training samples with first labels. The first label may be labelled manually, etc. For further description regarding the first label and the first training sample, please refer to the relevant description about the training of the corrosion thickness prediction model in FIG. 3 and description thereof.

When performing joint training on the potential prediction layer and the corrosion thickness prediction layer, the smart gas network safety management platform 130 may input each group of first training samples to the potential prediction layer to obtain the potential of a plurality of positions of the gas pipeline, input the potential of the plurality of positions to the corrosion thickness prediction layer as training sample data, and obtain the electrochemical corrosion thickness of each of the plurality of positions of the gas pipeline. The smart gas pipeline network safety management platform 130 may construct a loss function based on the first label corresponding to each group of first training samples and the output of the corrosion thickness prediction layer, synchronously and iteratively updated parameters of the potential prediction layer and the corrosion thickness prediction layer based on the loss function until a preset condition is satisfied, and obtain a trained potential prediction layer and a trained corrosion thickness prediction layer. The preset condition may be that the loss function is smaller than a threshold, the loss function converges, or a training period reaches a threshold.

In some embodiments, an input of the potential prediction layer may further include gas pipeline material. Please refer to FIG. 3 and description thereof for relevant description of the gas pipeline material.

As shown in FIG. 4, the smart gas pipeline network safety management platform 130 may input the environmental data 411 of each of the at least one position of the gas pipeline at the first time and the gas pipeline material 412 to the potential prediction layer 421, process the environmental data 411 and the gas pipeline material 412 through the potential prediction layer 421, and output the potential 431 of each position of the at least one position of the gas pipeline at the second time.

In some embodiments, an input of the corrosion thickness prediction layer may further include a first corrosion thickness and point information. For the purpose of convenience, the first corrosion thickness herein may refer to the corrosion thickness of each of the at least one position of the gas pipeline at the first time. The point information may be point information of each of the at least one position of the gas pipeline.

As shown in FIG. 4, the smart gas pipeline network safety management platform 130 may input the potential 431 of each position of the at least one position of the gas pipeline at the second time, the first corrosion thickness 413, and the point information 414 to the corrosion thickness prediction layer 422, process the potential 431, the first corrosion thickness 413, and the point information 414 through the corrosion thickness prediction layer 422, and output the electrochemical corrosion thickness 432 of each of the at least one position of the gas pipeline at the second time.

In some implementations, when the potential prediction layer and the corrosion thickness prediction layer are jointly trained, sample training data may also include sample gas pipeline material, a sample first corrosion thickness, and sample point information. A label of each group of training samples may be a electrochemical corrosion thickness corresponding to each group of training samples. For the sample gas pipeline material, the sample first corrosion thickness, the sample potential information, and the label, please refer to the description regarding the joint training of the potential prediction layer and the corrosion thickness prediction layer above, which is not be repeated herein.

When performing joint training on the potential prediction layer and the corrosion thickness prediction layer, the smart gas pipeline network safety management platform 130 may input each group of sample historical environmental data and the sample gas pipeline material into the potential prediction layer to obtain potential of a plurality of positions, take the potential of the plurality of positions as the training sample data, and input the potential of the plurality of positions into the corrosion thickness prediction layer together with the sample first corrosion thickness and the sample point information, and obtain the electrochemical corrosion thickness of each of the at least one position of the gas pipeline. For further description regarding the joint training of the potential prediction layer and the corrosion thickness prediction layer, please refer to the relevant description of the joint training above, which is not be repeated herein.

In some embodiments of the present disclosure, the potential information of each position on the surface of the gas pipeline may be determined by processing of the potential prediction layer of the corrosion thickness prediction model, and the electrochemical corrosion thickness of each position may be determined by processing of the corrosion thickness prediction layer based on the potential information, which can make the predicted electrochemical corrosion more targeted. At the same time, the gas pipeline material, the historical corrosion, and the point information may be considered, which can also help the predicted result more accurate.

Figure 5:
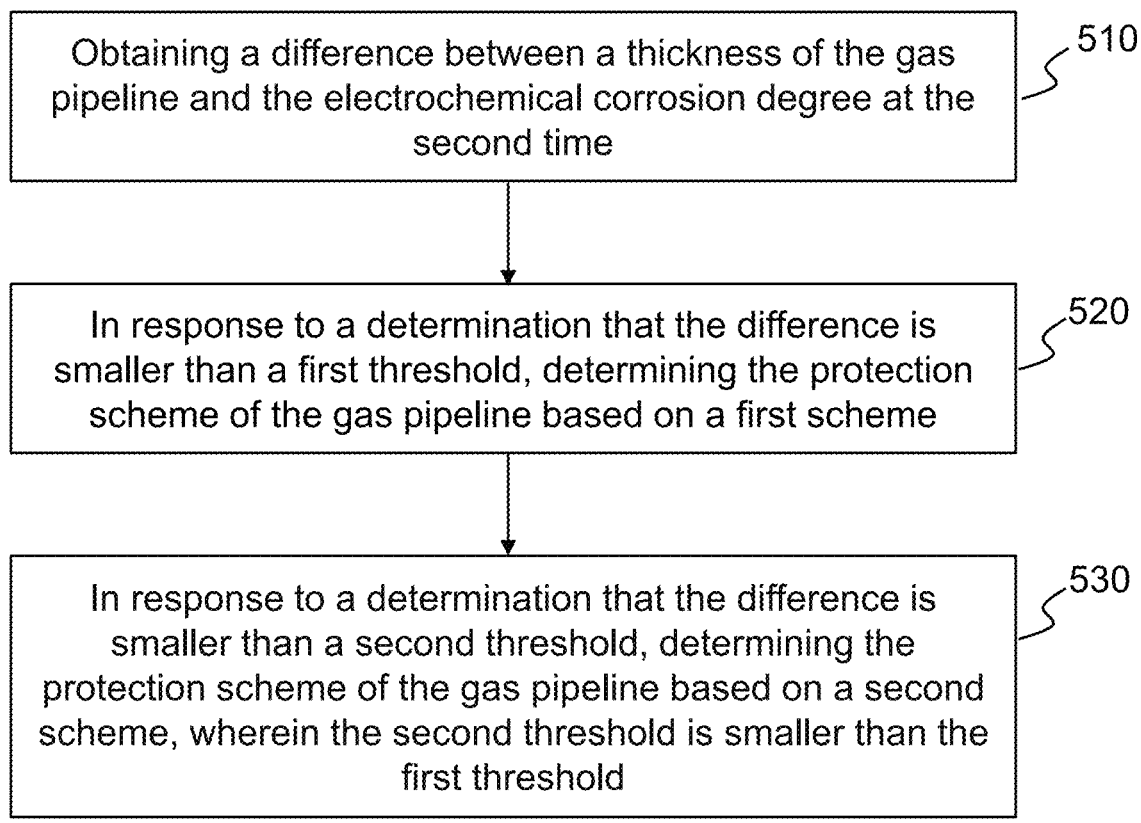
FIG. 5 is a flowchart illustrating an exemplary process for determining a protection scheme of the gas pipeline according to some embodiments of the present disclosure.

FIG. 5 is a flowchart illustrating an exemplary process for determining a protection scheme of the gas pipeline according to some embodiments of the present disclosure.

In some embodiments, the process 500 may be performed by the smart gas pipeline network safety management platform 130.

In 510, obtaining a difference between a thickness of the gas pipeline and an electrochemical corrosion degree at the second time.

The thickness of the gas pipeline may characterize a value of a current pipeline wall thickness of the gas pipeline, for example, 10 mm, 26 mm, etc. The thickness of the gas pipeline may be obtained based on the smart gas pipeline network object platform 150 (e.g., a measuring device). In some embodiments, during operation of the gas pipeline, due to influence of an external factor (e.g., external pressure, corrosion, etc.), a change in the thickness of the gas pipeline at different positions and at different time points may be obtained based on real-time monitoring of the smart gas pipeline network object platform 150.

The electrochemical corrosion degree at the second time may refer to an electrochemical corrosion degree at each of a plurality of time points in the future. Related description regarding the second time and the electrochemical corrosion degree may be found in FIG. 2 and description thereof.

The difference between the thickness of the gas pipeline and the electrochemical corrosion degree at the second time may represent a degree of electrochemical corrosion of the gas pipeline. For example, if the thickness of gas pipeline is 20 mm and the electrochemical corrosion degree is 2 mm, the difference may be 20 mm−2 mm=18 mm. It can be understood that a thickness of an initial gas pipeline (for example, when the gas pipeline is laid) is a fixed value. If the current gas pipeline is subject to electrochemical corrosion at the first time, the thickness of the current gas pipeline may decrease. When the electrochemical corrosion degree at the second time is greater, an inner wall of the gas pipeline may be gradually corroded, leading to a gas accident such as a gas leakage, etc. Therefore, electrochemical corrosion prevention is required for the gas pipeline. The difference may also reflect a safety degree of the gas pipeline at a certain position. The smaller the difference is, the greater the electrochemical corrosion degree may be and the greater the safety risk of the gas pipeline may be.

In 520, in response to a determination that the difference is smaller than a first threshold, determining a protection scheme of the gas pipeline based on a first scheme.

The first threshold may be a preset first warning threshold of the thickness of the gas pipeline, for example, 15 mm. The first threshold may be set based on a first preset ratio of the thickness of the initial gas pipeline. For example, if the thickness of the initial gas pipeline is 20 mm, and the first preset ratio is 10%, the first threshold may be set as 20 mm−(20 mm*10%)=18 mm.

In some embodiments, when the difference between the thickness of the gas pipeline and the electrochemical corrosion degree at the second time is smaller than the first threshold, the smart gas pipeline network safety management platform 130 may determine the protection scheme of the gas pipeline based on the first scheme.

Merely by way of example, the first scheme may include periodic cleaning of the gas pipeline. For example, the periodic dirt cleaning may be performed on a position of the gas pipeline with the difference smaller than the first threshold based on the smart gas pipeline network maintenance engineering object sub-platform.

The first scheme may also include antioxidant treatment. For example, an outer wall of a position of the gas pipeline with the difference smaller than the first threshold may be coated with an anti-oxidation and anti-corrosion coating based on the smart gas pipeline network maintenance engineering object sub-platform.

The first scheme may also include gas purification, etc. For example, an impurity content in delivered gas may be reduced (such as desulfurization treatment, etc.).

In 530, in response to a determination that the difference is smaller than a second threshold, determining the protection scheme of the gas pipeline based on a second scheme. The second threshold may be smaller than the first threshold.

The second threshold may be a preset second warning threshold of the thickness of the gas pipeline. The second threshold may be smaller than the first threshold. For example, the first threshold may be 18 mm and the second threshold may be 10 mm. The second threshold may be set based on a second preset ratio of the thickness of the initial gas pipeline. For example, if the thickness of the initial gas pipeline is 20 mm, and the second preset ratio may be set as 30% when the first preset ratio is 10%, the second threshold value may be set as 20 mm−(20 mm*30%)=14 mm. Merely by way of example, it can be understood that the thickness of the gas pipeline gradually decreases after the gas pipeline is gradually subjected to electrochemical corrosion. When the thickness of the gas pipeline is smaller than the second threshold, it may mean that the electrochemical corrosion degree of the gas pipeline is more serious and the safety risk is higher.

In some embodiments, when the difference between the thickness of the gas pipeline and the electrochemical corrosion degree at the second time is smaller than the second threshold, the smart gas network safety management platform 130 may determine the protection scheme of the gas pipeline based on the second scheme.

In some embodiments, the second scheme may include a first protection scheme and a second protection scheme.

The first protection scheme may refer to a cathode protection scheme. For example, a large amount of positive current may flow into a soil layer where the gas pipeline is located by installing an electric excitation device on the gas pipeline, which may effectively shorten time of the gas pipeline as a positive electrode of the electrochemical reaction, so that the gas pipeline may act as a cathode same as the soil layer, thereby slowing down the electrochemical corrosion of the outer wall of the gas pipeline.

In some embodiments, the smart gas network safety management platform 130 may distribute a preset count of cathode protection stations with a preset current power along the gas pipeline by section based on the smart gas pipeline network maintenance engineering object sub-platform, which may provide sufficient current supply for the pipeline soil layer. It should be noted that each cathode protection station has a certain protection radius, and due to different positions of the cathode protection stations, protection coverage and protection effect of the first protection scheme on the pipeline network may be different.

The second protection scheme may refer to an anode sacrifice protection scheme. For example, metal with strong reducibility may be used as a protection electrode, which may be connected to protected metal (e.g., material metal of gas pipeline) to form a galvanic battery. At this time, the metal with strong reducibility may be used as a negative electrode for oxidation reaction, and the protected metal (e.g., the gas pipeline) may be used as the positive electrode for avoiding corrosion.

In some embodiments, the smart gas pipeline network safety management platform 130 may determine the protection scheme of the gas pipeline based on the second scheme according to an actual condition such as coverage, the electrochemical corrosion of different positions, a cost budget, etc. of the gas pipeline. For example, the first protection scheme, the second protection scheme, or any combination thereof may be adopted for gas pipelines in different areas according to the distribution of the gas pipelines, which is not limited in the present disclosure.

In some embodiments, the first protection scheme may include determining a site selection scheme of at least one cathode protection station.

The site selection scheme may refer to a position setting scheme of a plurality of cathode protection stations for the gas pipeline. For example, the plurality of cathode protection stations may be set for the gas pipeline based on a preset distance interval.

In some embodiments, the smart gas pipeline network safety management platform 130 may determine, based on a preset distance step, the site selection scheme of the cathode protection station according to information such as the distribution, the coverage, the preset count of cathode protection stations to be built of the gas pipeline network. For example, if a width of the pipeline network is 10 km, the pipeline network is divided into 5 sections of gas pipelines (each section of the gas pipeline is 2 km in length), and the preset count of cathode protection stations is 5, a cathode protection station may be built at a midpoint of each section of the gas pipeline, respectively. The preset count of cathode protection stations may be determined based on an actual need (e.g., construction costs), etc.

In some embodiments, the smart gas pipeline network safety management platform 130 may determine a site selection scheme based on a preset algorithm according to the electrochemical corrosion degree of different positions of the gas pipeline. Related description regarding determining the site selection scheme based on the preset algorithm may be found in FIG. 6 and description thereof.

In some embodiments of the present disclosure, the different protection schemes of the gas pipeline may be determined according to the electrochemical corrosion degree of the gas pipeline, which can enrich the protection schemes and make the protection of the gas pipeline more targeted.

It should be noted that the above description of the process 500 is provided merely for example and illustration, and not intended to limit the scope of the present disclosure. For those skilled in the art, various modifications and changes can be made to the process under the guidance of the present disclosure. However, these corrections and changes are still within the scope of the present disclosure.

FIG. 6 is a flowchart illustrating an exemplary process for determining a target site selection scheme according to some embodiments of the present disclosure.

In some embodiments, the process 600 may be performed by the smart gas pipeline network safety management platform 130.

In 610, determining a plurality of candidate site selection schemes. Each of the plurality of candidate site selection schemes may include a set of site selection coordinates of a cathode protection station.

The candidate site selection scheme may refer to an alternative scheme used to determine a position of the cathode protection station of the gas pipeline. The candidate site selection scheme may include a set of site selection coordinates of the cathode protection station, i.e., site selection parameters in the candidate site selection scheme. For example, a candidate site selection scheme $X_i=(X_{i1}, X_{i2}, X_{i3}, \ldots, X_{in}, \ldots, X_{id})$, where i, n, d are positive integers, i denotes a serial number of the scheme, n denotes a position of the $n^{th}$ gas pipeline, and d denotes the preset count of cathode protection stations. $X_{in}$ denotes the site selection coordinates of the cathode protection station of the $n^{th}$ position of the $i^{th}$ scheme.

The site selection coordinates may refer to position coordinates of the gas pipeline where the cathode protection station is set.

In some embodiments, the site selection coordinates may be determined by geographic distribution of gas pipelines in the gas network. The site selection coordinates may be represented based on coordinates of the geographic latitude and longitude of a certain position of the gas pipeline, for example, (40.1, 60.81).

In some embodiments, the site selection coordinates may also be determined based on a preset coordinate system of the gas pipelines in the gas pipeline network. For example, the site selection coordinates may be determined based on the distribution of the gas pipeline in the city, sections of the gas pipeline, and preset position markers of each section of the gas pipeline. Exemplarily, the site selection coordinates may be (a, 0), (a, 10), (a, 20), which may respectively represent positions of 0 m, 10 m, and 20 m starting from an interface of the gas pipeline of section a. There may be various schemes regarding the site selection coordinates, which are only used here as examples.

In some embodiments, an initial plurality of candidate site selection schemes may be generated by a random manner.

In 620, determining a target site selection scheme based on a preset evaluation function by performing at least one round of iterative updating on the plurality of candidate site selection schemes.

The target site selection scheme may refer to a scheme ultimately used to determine the position of the cathode protection station of the gas pipeline. In some embodiments, the smart gas pipeline network safety management platform 130 may perform the at least one round of iterative updating on the initial plurality of candidate site selection schemes, determine an evaluation value of each candidate site selection scheme based on the preset evaluation function, and sort the candidate site selection schemes based on the evaluation value (e.g., in descending order), and select the candidate selection scheme corresponding to the highest ranked evaluation value as the target position selection scheme.

The evaluation value may be used to evaluate an effect of electrochemical corrosion protection of each candidate site selection scheme. The evaluation value may be a numerical value. The larger the value is, the better the protection effect of the site selection scheme may be. The evaluation value may be determined based on an evaluation function value obtained by the preset evaluation function.

In some embodiments, the evaluation function may be related to a corrosion thickness at the second time. For example, the evaluation function may simulate establishment of the cathode protection station according to the site selection coordinates of each cathode protection station in the candidate site selection scheme, predict the electrochemical corrosion thickness of each of the at least one position of the gas pipeline at the second time based on a corrosion thickness prediction model, and determine a sum of the electrochemical corrosion thicknesses of all the positions.

It can be understood that the smaller the value of the sum is, the better the protection effect of the gas pipeline of the cathode protection station determined based on the candidate site selection scheme may be. Accordingly, the evaluation value of the evaluation function may be inversely proportional to the value of the sum. For example, the evaluation function may be $G(X_i)=1/S$, where a value of $G(X_i)$ denotes the evaluation value of the $i^{th}$ candidate site selection scheme $X_i$, and S denotes the sum of the electrochemical corrosion thickness of each of the at least one position at the second time.

In some embodiments, the smart gas network safety management platform 130 may determine the target site selection scheme by performing a plurality of rounds of iterative updating on the initial candidate site selection scheme, and comparing the evaluation values of a plurality of updated candidate site selection schemes based on each round of iterative updating. The initial candidate site selection scheme randomly generated may be $(X^0_{i1}, X^0_{i2}, \ldots, X^0_{in}, \ldots, X^0_{iD})$, etc., where 0 is an identifier, which represents a round of iteration. The $0^{th}$ round of iteration represents an initial value of the iteration that has not yet started. Accordingly, 1 represents the first round of iteration, 2 represents the second round of iteration, and so on.

In some embodiments, each of the at least one round of iterative updating may include: for the site selection scheme of at least one cathode protection station, updating a corresponding multi-dimensional increment to be processed based on the relationship between the site selection scheme of the cathode protection station and the site selection scheme of an optimal cathode protection station in the history, and updating the site selection scheme of the candidate cathode protection station based on the updated multi-dimensional increment, which is described through the following operations S1 and S2.

In S1, for the site selection scheme of at least one cathode protection station, updating the corresponding multi-dimensional increment to be processed based on the relationship between the site selection scheme of the cathode protection station and the site selection scheme of the optimal cathode protection station in the history.

In some embodiments, for the candidate site selection scheme $X_i$, the site selection scheme of the optimal cathode protection station in the history may include an individual optimal site selection scheme corresponding to the candidate site selection scheme $X_i$, and an group optimal site selection scheme jointly corresponding to the plurality of candidate site selection schemes. The group optimal site selection schemes corresponding to the plurality of candidate site selection schemes may be the same. The individual optimal site selection schemes may be different.

The individual optimal site selection scheme corresponding to the $i^{th}$ candidate site selection scheme may refer to an updated candidate site selection scheme with a greatest evaluation value among the plurality of updated candidate site selection schemes corresponding to the $i^{th}$ candidate site selection scheme as of the current round of iteration updating. For example, during a $k^{th}$ round of iteration, the individual optimal site selection scheme corresponding to the $i^{th}$ candidate site selection scheme may be the updated candidate site selection scheme with a greatest evaluation value among all the updated $i^{th}$ candidate site selection schemes during a process of previous k−1 rounds of iteration.

The group optimal site selection scheme corresponding to the $i^{th}$ candidate site selection scheme may refer to an updated candidate site selection scheme with a greatest evaluation value among all updated candidate site selection schemes corresponding to the plurality of candidate site selection schemes as of the current round of iteration. For example, during the $k^{th}$ round of iteration, the group optimal site selection scheme corresponding to the $i^{th}$ candidate site selection scheme may be the updated candidate site selection scheme with a greatest evaluation value among all the candidate site selection schemes during a process of the previous k−1 rounds of iteration.

The multi-dimensional increment may refer to an update range of candidate site selection parameters of the candidate site selection scheme. The multi-dimensional increment may be more than one. The plurality of multi-dimensional increments may be in a one-to-one correspondence with the plurality of candidate site selection schemes. The multi-dimensional increment may include a plurality of sub-increments. Each sub-increment may represent an element of each dimension of the multi-dimensional increment. The plurality of sub-increments may be in a one-to one correspondence with an adjustment range (a direction and a distance of offset or adjustment of the site selection coordinates) of the site selection coordinates of each cathode protection station in the candidate site selection scheme. The multi-dimensional increment may be expressed as $V_{in}=(V_{i1}, V_{i2}, \ldots, V_{id})$, where $V_{in}$ denotes the adjustment range of the site selection coordinates of the $n^{th}$ cathode protection station. For example, for the candidate site selection scheme $X_i$, $V_{i1}$ denotes the adjustment range of $X_{i1}$, $V_{i2}$ denotes the adjustment range of $X_{i2}$, and so on. It should be noted that the $V_{id}$ needs to meet a constraint. For example, the site selection coordinates of the cathode protection station corresponding to the adjusted $V_{id}$ may be within a range of the gas pipeline network.

In some embodiments, the iterative updating on the candidate site selection scheme performed by the smart gas pipeline network safety management platform 130 may include iteratively updating each site selection parameter based on a sub-increment corresponding to each site selection parameter. For example, the sub-increment may be added to the original site selection parameter to obtain an updated site selection parameter, that is, an updated multi-dimensional increment may be expressed as $(X_{i1}+V_{i1}, X_{i2}+V_{i2}, \ldots, X_{in}+V_{in}, \ldots, X_{id}+V_{id})$. The addition of the site selection parameters may represent the offset (including the direction of the offset) of the site selection coordinates of the cathode protection station corresponding to the site selection parameters.

In some embodiments, for at least one of the plurality of rounds of iterative updating, the smart gas pipeline network safety management platform 130 may, based on the relationship between the candidate site selection scheme and the site selection scheme of the optimal cathode protection station in the history, update the multi-dimensional increment of the candidate site selection scheme based on the following equation (1) to obtain an updated multi-dimensional increment.

$$V^{k+1}_{id} = wV_{id}^k + c_1r_1(P^k_{id,pbest} - X^k_{id}) + c_2r_2(P^k_{id,gbest} - X^k_{id}) \quad (1)$$

where for equation (1), i denotes a serial number of each candidate scheme of the plurality of (e.g., N) candidate schemes, i is a positive integer less than or equal to N, d denotes the dimension of the candidate site selection scheme, each dimension represents the site selection parameters (site selection coordinates) of each cathode protection station; K denotes a count of rounds of current iteration, and w is a preset weight coefficient, e.g., 0.3, etc.

$V_{id}^k$ denotes the adjustment range of the $d^{th}$ dimension of site selection parameter (increment of the $d^{th}$ dimension of site selection parameter) in the $i^{th}$ candidate site selection scheme during the $k^{th}$ round of iteration.

$c_1$ denotes an individual learning factor, which may be a preset coefficient, for example, 0.4, $c_2$ denotes a group learning factor, which may be a preset system, for example, 0.5, both $r_1$ and $r_2$ may be preset values in an interval of [0, 1], for example, $r_1$=0.4, $r_2$=0.6. $r_1$ and $r_2$ may be random, which may be used to increase randomness of local (individual) and global (group) searches.

$X^k_{id}$ denotes the $d^{th}$ dimension of site selection parameter of the $i^{th}$ candidate site selection scheme during the $k^{th}$ round of iteration.

$P^k_{id,pbest}$ denotes the individual optimal site selection parameter corresponding to the $d^{th}$ dimension of site selection parameter in the $i^{th}$ candidate site selection scheme during the $k^{th}$ round of iteration, which may be obtained by searching the site selection parameters of all the dimensions of the updated site selection schemes of the $i^{th}$ candidate site selection scheme of previous k−1 rounds of iteration.

$P^k_{id,gbest}$ denotes the group optimal site selection parameter corresponding to the $d^{th}$ dimension of site selection parameter in the $i^{th}$ candidate site selection scheme during the $k^{th}$ round of iteration, which may be obtained by searching the site selection parameters of all the dimensions of the updated site selection schemes of the $i^{th}$ candidate site selection scheme of previous k−1 rounds of iteration.

Based on the above equation (1), the smart gas pipeline network safety management platform 130 may update the adjustment range of the site selection coordinates of each cathode protection station in the candidate site selection scheme $X_i$, i.e., the multi-dimensional increment $V^{k+1}_{id}$, so as to obtain the updated multi-dimensional increment.

In S2, updating the site selection scheme of the candidate cathode protection station based on the updated multi-dimensional increment.

In some embodiments, the smart gas pipeline network safety management platform 130 may update the candidate site selection scheme based on the updated multi-dimensional increment of the candidate site selection scheme obtained from each round of iteration, and the update manner may be based on the following equation (2):

$$X^{k+1}_{id} = X^k_{id} + V^{k+1}_{id} \quad (2)$$

where $X^{k+1}_{id}$ in equation (2) denotes the $d^{th}$ dimension of site selection parameter (i.e., the site selection coordinates of a $d^{th}$ position) of the current round ($(k+1)^{th}$ round round) of iteration, $X^k_{id}$ denotes the $d^{th}$ dimension of site selection parameter of a previous round ($k^{th}$ round) of iteration, and $V^{k+1}_{id}$ denotes the increment of the $d^{th}$ dimension of site selection parameter.

In some embodiments, the smart gas pipeline network safety management platform 130 may use the updated cathode protection station site selection scheme of the current round of iteration as a candidate site selection scheme of a next round of iteration until a condition of termination of the iteration is met.

In some embodiments, the condition of termination of the iteration may include that a preset condition is met, etc. The preset condition may be that the evaluation value meets a requirement, the evaluation value converges, the iteration reaches a specified count of rounds of iteration, or the like, or any combination thereof.

In some embodiments of the present disclosure, the plurality of candidate site selection schemes may be iteratively updated through the preset algorithm, which can help to quickly obtain the optimal site selection scheme, and set the position of the cathode protection station of the gas pipeline based on the optimal site selection scheme, thereby making the protection of gas pipeline more comprehensive and effective.

It should be noted that the above description of the process 600 is provided merely for example and illustration, and not intended to limit the scope of the present disclosure. For those skilled in the art, various modifications and changes can be made to the procedures under the guidance of the present disclosure. However, these corrections and changes are still within the scope of the present disclosure.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for assessing electrochemical corrosion of a smart gas pipeline, implemented based on a processor of a smart gas pipeline network safety management platform of an Internet of Things (IoT) system, comprising:

determining an electrochemical corrosion degree of a gas pipeline at a second time by processing environmental data, gas pipeline material of the gas pipeline, an electrochemical corrosion thickness of the gas pipeline at a first time, and point information of each of at least one position of the gas pipeline based on a corrosion thickness prediction model, wherein the electrochemical corrosion degree of the gas pipeline at the second time includes an electrochemical corrosion degree of each of the at least one position of the gas pipeline, and the corrosion thickness prediction model is a machine learning model, wherein the first time is before the second time;

obtaining a difference between a thickness of the gas pipeline and the electrochemical corrosion degree at the second time;

in response to a determination that the difference is smaller than a first threshold, determining a protection scheme of the gas pipeline based on a first scheme;

sending the protection scheme to a smart gas pipeline network maintenance engineering object sub-platform to control a maintenance appliance to perform at least one of a periodic dirt cleaning, coating an outer wall with an anti-oxidation, and anti-corrosion coating, or a gas purification on a position of the gas pipeline with the difference smaller than the first threshold, wherein the smart gas pipeline network maintenance engineering object sub-platform includes a maintenance vehicle, the maintenance appliance and an alarm device; and in response to a determination that the difference is smaller than a second threshold, determining the protection scheme of the gas pipeline based on a second scheme;

wherein the determining the protection scheme of the gas pipeline based on a second scheme includes:

determining a plurality of candidate site selection schemes of at least one cathode protection station, each of the plurality of candidate site selection schemes comprising a set of site selection coordinates of the at least one cathode protection station;

performing at least one round of iterative updating on the plurality of candidate site selection schemes based on a preset algorithm and evaluating the plurality of candidate site selection schemes after the at least one round of iterative updating using a preset evaluation function to determine a target site selection scheme;

determining a cathode protection scheme based on the target site selection scheme, and determining a protection scheme of the gas pipeline based on the cathode protection scheme and an anode sacrifice protection scheme; and sending the cathode protection scheme to the smart gas pipeline network maintenance engineering object sub-platform to control the maintenance appliance to install an electric excitation device on the gas pipeline and to control the maintenance appliance and the maintenance vehicle to build a plurality of cathode protection stations for the gas pipeline based on the target site selection scheme;

wherein the corrosion thickness prediction model comprises a potential prediction layer and a corrosion thickness prediction layer; and wherein the determining an electrochemical corrosion degree of a gas pipeline at a second time by processing environmental data, gas pipeline material of the gas pipeline, an electrochemical corrosion thickness of the gas pipeline at a first time, and point information of each of at least one position of the gas pipeline based on a corrosion thickness prediction model includes:

determining potential of the each of the at least one position of the gas pipeline at the second time by processing environmental data of the at least one position at the first time based on the potential prediction layer; and determining the electrochemical corrosion thickness of the each of the at least one position of the gas pipeline at the second time by processing the potential of the each of the at least one position, an electrochemical corrosion thickness of the each of the at least one position at the first time, and the point information of the each of the at least one position based on the corrosion thickness prediction layer, wherein the potential prediction layer and the corrosion thickness prediction layer are obtained through joint training based on a plurality of sets of first training samples with first labels; the first training samples include sample environmental data of a plurality of positions of the gas pipeline at a first historical time, the first labels are sample electrochemical corrosion thicknesses of the plurality of positions of the gas pipeline at a second historical time, and the first historical time is before the second historical time;

wherein the joint training includes:

inputting the first training samples to an initial potential prediction layer to obtain initial potential of the plurality of positions of the gas pipeline;

inputting the initial potential of the plurality of positions into an initial corrosion thickness prediction layer to obtain an initial electrochemical corrosion thickness of each of the plurality of positions of the gas pipeline;

constructing a loss function based on the first labels and the initial electrochemical corrosion thickness of the each of the plurality of positions, and updating parameters of the initial potential prediction layer and the initial corrosion thickness prediction layer iteratively based on the loss function.

2. The method of claim 1, wherein the evaluating the plurality of candidate site selection schemes after the at least one round of iterative updating using a preset evaluation function to determine a target site selection scheme includes:

determining evaluation values of the plurality of candidate site selection schemes based on the preset evaluation function, the evaluation values reflecting an effect of electrochemical corrosion protection of the candidate site selection schemes; and designating a candidate site selection scheme with a highest evaluation value in the candidate site selection schemes as the target site selection scheme.

3. The method of claim 1, wherein candidate site selection schemes of the at least one cathode protection station after a current round of iterative updating are used as candidate site selection schemes for a next round of iteration updating until an iteration termination condition is met; and the iteration termination condition includes at least one of an evaluation value meeting a preset requirement, the evaluation value converging, and the iterative updating reaching a preset count of rounds.

4. The method of claim 1, wherein a smart gas user platform comprises a gas user sub-platform and a supervision user sub-platform;

a smart gas service platform includes a smart gas use service sub-platform corresponding to the gas user sub-platform, and a smart supervision service sub-platform corresponding to the supervision user sub-platform;

the smart gas pipeline network safety management platform includes a smart gas pipeline network risk assessment management sub-platform and a smart gas data center, wherein the smart gas pipeline network risk assessment management sub-platform includes a pipeline network basic data management module, a pipeline network operation data management module, and a pipeline network risk assessment management module;

a smart gas pipeline network sensor network platform includes a smart gas pipeline network device sensor network sub-platform and a smart gas pipeline network maintenance engineering sensor network sub-platform; and a smart gas pipeline network object platform includes a smart gas pipeline network device object sub-platform and a smart gas pipeline network maintenance engineering object sub-platform.

5. A non-transitory computer-readable storage medium storing computer instructions, wherein when reading the computer instructions in the storage medium, a computer implements the method for assessing electrochemical corrosion of a smart gas pipeline according to claim 1.

6. The method of claim 1, wherein the corrosion thickness prediction layer includes a Transformer model; and the corrosion thickness prediction layer is obtained by individually training a plurality of sets of second sample training data with second labels, wherein the plurality of sets of second sample training data include potential of the plurality of positions of the gas pipeline at the first time, the second labels include an electrochemical corrosion thickness of each position at the second historical time, and a training process of the corrosion thickness prediction layer includes: inputting each set of second training samples to the initial corrosion thickness prediction layer; processing the each set of second training samples through the initial corrosion thickness prediction layer; and outputting the electrochemical corrosion thickness of the gas pipeline at the second time.

7. An Internet of Things (IoT) system, comprising a smart gas user platform, a smart gas service platform, a smart gas pipeline network safety management platform, a smart gas pipeline network sensor network platform, and a smart gas pipeline network object platform, wherein the smart gas pipeline network object platform is configured to: obtain environmental data of a gas pipeline at a first time, and transmit the environmental data to the smart gas pipeline network safety management platform through the smart gas pipeline network sensor network platform; and the smart gas pipeline network safety management platform further is configured to:
determine an electrochemical corrosion degree of a gas pipeline at a second time by processing environmental data, gas pipeline material of the gas pipeline, an electrochemical corrosion thickness of the gas pipeline at a first time, and point information of each of at least one position of the gas pipeline based on a corrosion thickness prediction model, wherein the electrochemical corrosion degree of the gas pipeline at the second time includes an electrochemical corrosion degree of each of the at least one position of the gas pipeline, the corrosion thickness prediction model is a machine learning model;

obtain a difference between a thickness of the gas pipeline and the electrochemical corrosion degree at the second time;

in response to a determination that the difference is smaller than a first threshold, determine a protection scheme of the gas pipeline based on a first scheme;

send the protection scheme to a smart gas pipeline network maintenance engineering object sub-platform to control a maintenance appliance to perform at least one of a periodic dirt cleaning, coating an outer wall with an anti-oxidation and anti-corrosion coating, or a gas purification on a position of the gas pipeline with the difference smaller than the first threshold, wherein the smart gas pipeline network maintenance engineering object sub-platform includes a maintenance vehicle, the maintenance appliance and an alarm device; and in response to a determination that the difference is smaller than a second threshold, wherein to determine the protection scheme of the gas pipeline based on a second scheme; and the smart gas pipeline network safety management platform is further configured to:
determine a plurality of candidate site selection schemes of at least one cathode protection station, each of the plurality of candidate site selection schemes comprising a set of site selection coordinates of the at least one cathode protection station;

perform at least one round of iterative updating on the plurality of candidate site selection schemes based on a preset algorithm and evaluate the plurality of candidate site selection schemes after the at least one round of iterative updating using a preset evaluation function to determine a target site selection scheme;

determine a cathode protection scheme based on the target site selection scheme, and determine a protection scheme of the gas pipeline based on the cathode protection scheme and an anode sacrifice protection scheme; and send the cathode protection scheme to the smart gas pipeline network maintenance engineering object sub-platform to control the maintenance appliance to install an electric excitation device on the gas pipeline and to control the maintenance appliance and the maintenance vehicle to build a plurality of cathode protection stations for the gas pipeline based on the target site selection scheme;

wherein the corrosion thickness prediction model comprises a potential prediction layer and a corrosion thickness prediction layer; and wherein to determine the electrochemical corrosion thickness degree of the gas pipeline at the second time by processing the environmental data, gas pipeline material of the gas pipeline, an electrochemical corrosion thickness of the gas pipeline at a first time, and point information of each of at least one position of the gas pipeline based on a corrosion thickness prediction model includes:

determine potential of the each of the at least one position of the gas pipeline at the second time by processing environmental data of the at least one position at the first time based on the potential prediction layer; and determine the electrochemical corrosion thickness of the each of the at least one position of the gas pipeline at the second time by processing the potential of the each of the at least one position, an electrochemical corrosion thickness of the each of the at least one position at the first time, and the point information of the each of the at least one position based on the corrosion thickness prediction layer, wherein the potential prediction layer and the corrosion thickness prediction layer are obtained through joint training based on a plurality of sets of first training samples with first labels; the first training samples include sample environmental data of a plurality of positions of the gas pipeline at a first historical time, the first labels are sample electrochemical corrosion thicknesses of the plurality of positions of the gas pipeline at a second historical time, the first historical time is before the second historical time;

wherein the joint training includes:
inputting the first training samples to an initial potential prediction layer to obtain initial potential of the plurality of positions of the gas pipeline;
inputting the initial potential of the plurality of positions into an initial corrosion thickness prediction layer to obtain an initial electrochemical corrosion thickness of each of the plurality of positions of the gas pipeline; and
constructing a loss function based on the first labels and the initial electrochemical corrosion thickness of the each of the plurality of positions, and
updating parameters of the initial potential prediction layer and the initial corrosion thickness prediction layer iteratively based on the loss function.

8. The IoT system of claim 7, wherein the smart gas pipeline network safety management platform is further configured to:
determine evaluation values of the plurality of candidate site selection schemes based on the preset evaluation function, the evaluation values reflecting an effect of electrochemical corrosion protection of the candidate site selection schemes; and
designate a candidate site selection scheme with a highest evaluation value in the candidate site selection schemes as the target site selection scheme.

9. The IoT system of claim 7, wherein candidate site selection schemes of the at least one cathode protection station after a current round of iterative updating are used as candidate site selection schemes for a next round of iteration updating until an iteration termination condition is met; and the iteration termination condition includes at least one of an evaluation value meeting a preset requirement, the evaluation value converging, and the iterative updating reaching a preset count of rounds.

10. The IoT system of claim 7, wherein the smart gas user platform comprises a gas user sub-platform and a supervision user sub-platform; the smart gas service platform comprises a smart gas use service sub-platform corresponding to the gas user sub-platform, and a smart supervision service sub-platform corresponding to the supervision user sub-platform;
the smart gas pipeline network safety management platform includes a smart gas pipeline network risk assessment management sub-platform and a smart gas data center, wherein the smart gas pipeline network risk assessment management sub-platform includes a pipeline network basic data management module, a pipeline network operation data management module, and a pipeline network risk assessment management module;
the smart gas pipeline network sensor network platform includes a smart gas pipeline network device sensor network sub-platform and a smart gas pipeline network maintenance engineering sensor network sub-platform; and
the smart gas pipeline network object platform includes a smart gas pipeline network device object sub-platform and a smart gas pipeline network maintenance engineering object sub-platform.

* * * * *